V. E. PALMER.
FOLDING CAR STEP.
APPLICATION FILED JULY 6, 1915.
1,177,798.
Patented Apr. 4, 1916.
Fig. 1
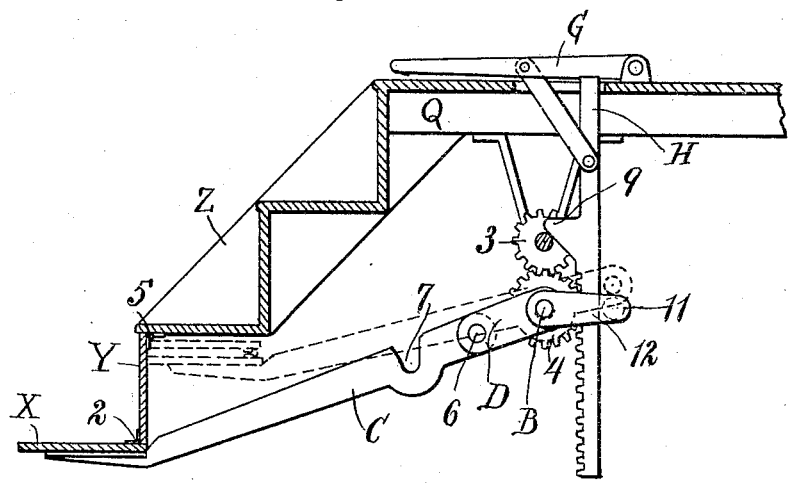
Fig. 2
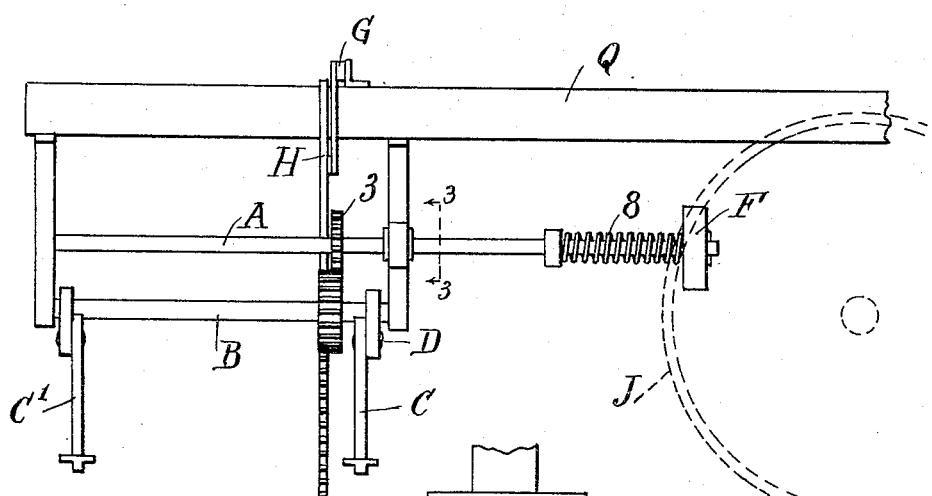
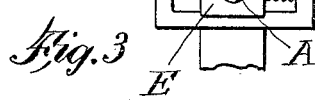
Fig. 3
WITNESSES
INVENTOR
Vernon E. Palmer
BY
F. N. Gilbert
ATTORNEY

UNITED STATES PATENT OFFICE.

VERNON E. PALMER, OF GREENE, NEW YORK.

FOLDING CAR-STEP.

1,177,798.  Specification of Letters Patent.  Patented Apr. 4, 1916.

Application filed July 6, 1915. Serial No. 38,266.

*To all whom it may concern:*

Be it known that I, VERNON E. PALMER, a citizen of the United States, residing at Greene, in the county of Chenango and State of New York, have invented certain new and useful Improvements in Folding Car-Steps, of which the following is a specification.

My invention relates to an improvement in folding car steps in which an additional step is automatically folded up under the lower stationary step and which can be automatically unfolded for use and it has for its object to provide an additional car step to be used in place of the portable boxes now used to furnish an additional step in going from the car to the ground, and also a step which is readily folded up out of the way when not in use.

With this object in view my invention consists of certain novel features of construction and arrangement of parts as will be hereinafter fully described and pointed out in the claim, reference being had to the accompanying drawings in which—

Figure 1 is a side view of my device applied to a car platform and steps. Fig. 2 is a front view of my device as applied to a car platform. Fig. 3 is a section on the line 3—3 of Fig. 2.

The same reference characters denote like parts in each of the several figures of the drawings.

In carrying out my invention I have the ordinary lower car step Z and the car platform Q. Hinged to the lower car step Z at the point 5 I have the riser Y and hinged to the riser Y at the point 2 I have the folding step X. Supporting X I have two side reaches C and C', C being on the right side as you face the steps and C' being on the left hand side as you face the steps. Mounted on the under side of the platform Q and running parallel therewith I have the shafts A and B; mounted on shaft A I have the cog wheel 3 and mounted on the shaft B I have the cog wheel 4 which meshes into wheel 3. As before stated the step X is hinged to the riser Y which in turn is hinged to the lower permanent car step by the hinge 5. Mounted on the shaft B, I have the lever D which has pivotal connection with the reach C at the point 6. In the upper face of C I have the curved recess 7 (this is the same in both reaches) and which recess is adapted to fit around the shaft B. Mounted on the under side of platform Q, I have the sliding box E through which passes the shaft A and which shaft A has mounted on the end of it the friction wheel F held in movable position on the shaft by means of the coil spring 8. Mounted on the platform Q I have the lever G. Coupled to lever G, I have the vertical rod H which passes down through the platform Q. On the front side of rod H, I have the cammed or shouldered projection 9. Farther down on the front side of H, I have a series of teeth or cogs 10 adapted to mesh into the cogs of wheel 4. Back of rod H, I have mounted a small friction roller 11, said roller being supported between two side supports 12, 12. The front ends of which supports project in the form of bands passing around shaft B; the friction roller 11 holds the rod H and its teeth 10 in close contact with and meshing into the wheel 4.

In the operation of my device when I wish to fold up step X and riser Y, I lift lever G which pulls up rod H; which turns wheel 4; which turns shaft B; which turns crank D; which moves the side reaches C and C' backward and upward drawing the riser Y up under step Z and step X up against riser Y and the crank D turns on around until the reaches C and C', are firmly locked by shaft B entering recesses 7 of said reaches. When I wish to unfold the riser Y and step X, I press down on lever G which presses down rod H, and the reverse order of movement takes place. When I press down on lever G thus lowering H the cammed or shouldered projection 9 contacts with shaft A which moves shaft A forward; which brings friction wheel F in contact with wheel J and it is thus in contact when the step is down and the car standing still. If for any reason the railroad guard or operator forgets to fold up step X when the car starts the friction wheel F will be turned by the moving car wheel J which will turn shaft A, and cog wheel 3 thus meshed into wheel 4, and which wheel 4 will turn shaft B and with the previous operation described, the step X will be automatically folded up.

Having thus described my invention what I claim as new and for which I desire Letters Patent is as follows:

In a car step, a folding step hinged to the lower riser of steps of a car platform; two side reaches pivotally mounted beneath the platform and having pivotal connection with said folding step; parallel shafts mounted beneath the car platform, one resting in and supported by a sliding box; opposite cog wheels mounted on said shafts adapted to mesh into each other; a friction pulley mounted on the end of one shaft capable of contacting with the rim of the car wheel; a lever mounted on said platform having pivotal connection with the supporting reaches; a vertical rod mounted on platform having connection with platform lever and having a curved surface; also a series of cog teeth mounted thereon; a friction roller mounted on said shaft capable of exerting a pressure against said rods causing the sliding shaft box to move forward and the cogs to mesh.

In testimony whereof I have affixed my signature in presence of two witnesses.

VERNON E. PALMER.

Witnesses:
E. A. JOYNER,
M. F. TERRY.

Copies of this patent may be obtained for five cents each, by addressing the "Commissioner of Patents, Washington, D. C."